United States Patent [19]

Peacock

[11] Patent Number: 5,154,340
[45] Date of Patent: Oct. 13, 1992

[54] METHOD AND DEVICE FOR FRICTIONAL WELDING

[76] Inventor: Harold B. Peacock, 867 N. Belair Rd., Evans, Ga. 30809

[21] Appl. No.: 724,660

[22] Filed: Jul. 2, 1991

[51] Int. Cl.$^5$ ............................................. B23K 20/12
[52] U.S. Cl. .................................. 228/112; 228/114
[58] Field of Search ................................ 228/112–114, 228/125, 168, 169, 174, 2; 156/73.5

[56] References Cited

U.S. PATENT DOCUMENTS

| | | | |
|---|---|---|---|
| 2,871,555 | 2/1959 | Foster | 29/474.3 |
| 2,873,238 | 2/1959 | Ohlinger et al. | 204/154.2 |
| 3,144,710 | 8/1964 | Hollander et al. | 29/470.3 |
| 3,225,437 | 12/1965 | Stohr et al. | 29/473.5 |
| 3,392,438 | 7/1968 | Coulter et al. | 29/477 |
| 3,444,611 | 5/1969 | Bogart | 228/112 |
| 3,452,421 | 7/1969 | Cheng et al. | 29/470.3 |
| 3,504,425 | 4/1970 | Sutovsky et al. | 228/112 |
| 3,611,535 | 10/1971 | Nobach | 29/159.01 |
| 3,618,196 | 11/1971 | Sluetz | 29/470.3 |
| 3,631,585 | 1/1972 | Stamm | 228/112 |
| 3,725,635 | 4/1973 | Fink et al. | 219/121 |
| 3,726,135 | 4/1973 | Vuceta | 228/112 |
| 3,762,030 | 10/1973 | Rajala | 29/470.3 |
| 3,853,258 | 12/1974 | Louw et al. | 228/2 |
| 3,897,623 | 8/1975 | Tasaki et al. | 228/112 |
| 4,063,676 | 12/1977 | Lilly | 228/114 |
| 4,542,846 | 9/1985 | Matsui et al. | 228/112 |
| 4,729,870 | 3/1988 | Mercier et al. | 376/451 |
| 4,817,852 | 4/1989 | Hill | 228/114 |
| 4,832,769 | 5/1989 | Shantz et al. | 156/73.5 |
| 4,921,663 | 5/1990 | Boatwright | 376/451 |

FOREIGN PATENT DOCUMENTS

| | | | |
|---|---|---|---|
| 43-20104 | 8/1968 | Japan | 228/112 |
| 49-6026 | 2/1974 | Japan | 228/114 |
| 56-62687 | 5/1981 | Japan | 228/112 |
| 797859 | 1/1981 | U.S.S.R. | 228/112 |

OTHER PUBLICATIONS

Metals Handbook Ninth Edition, vol. 6, "Friction Welding", pp. 719–728, copyright 1983.

Primary Examiner—Samuel M. Heinrich
Attorney, Agent, or Firm—Harold M. Dixon; William R. Moser; Richard E. Constant

[57] ABSTRACT

A method for friction welding that produces a seal having essentially no gas porosity, comprises two rotationally symmetric, generally cylindrical members, spaced apart and coaxially aligned, that are rotated with respect to each other and brought together under high pressure. One member is preferably a generally cylindrical cannister that stores uranium within its hollow walls. The other member is preferably a generally cylindrical, hollow weld ring. An annular channel formed in the weld ring functions as an internal flash trap and is uniquely designed so that substantially all of the welding flash generated from the friction welding is directed into the channel's recessed bottom. Also, the channel design limits distortion of the two members during the friction welding process, further contributing to the complete seal that is obtained.

18 Claims, 2 Drawing Sheets

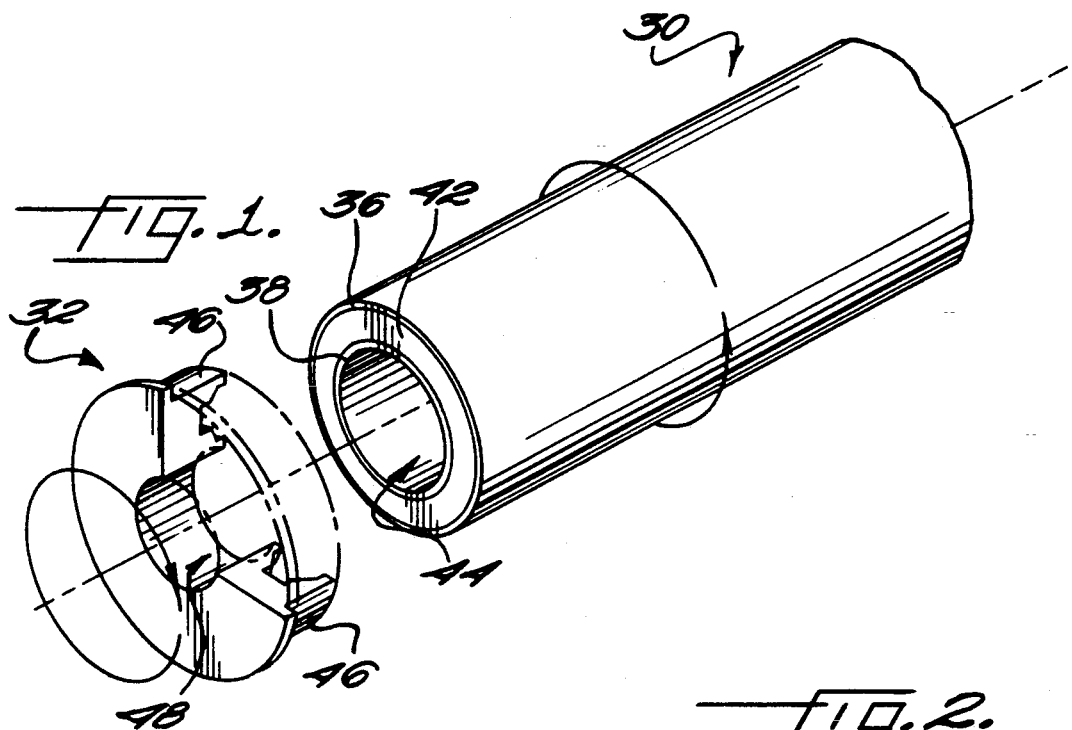
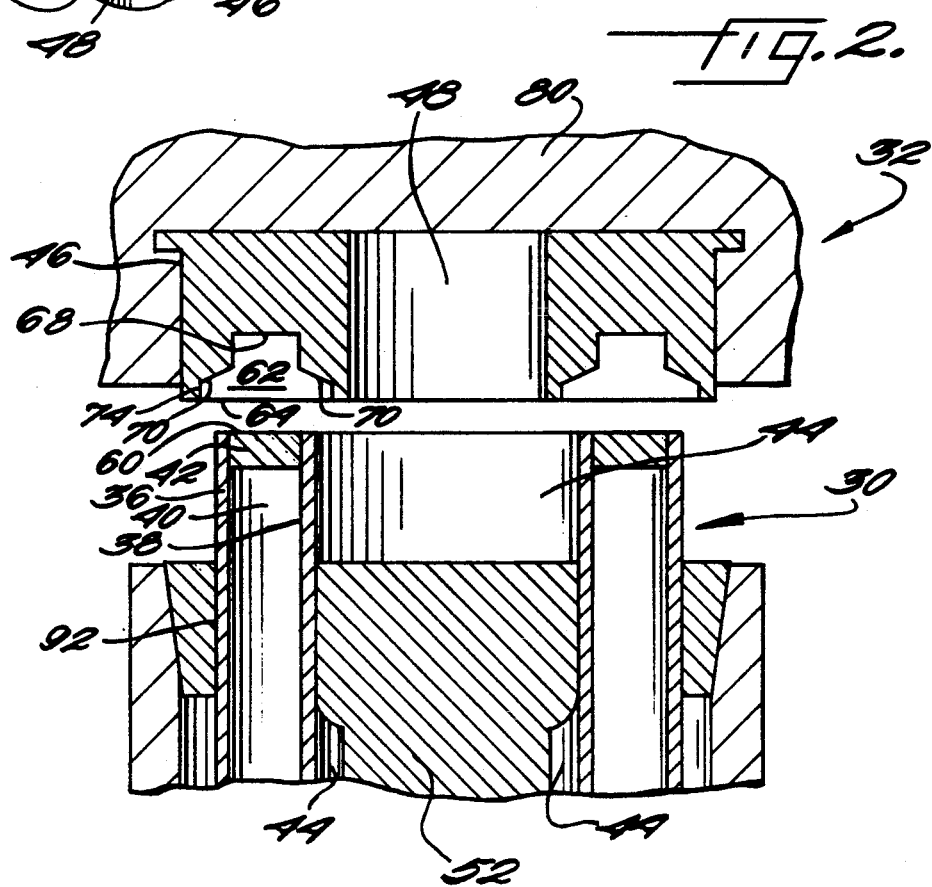

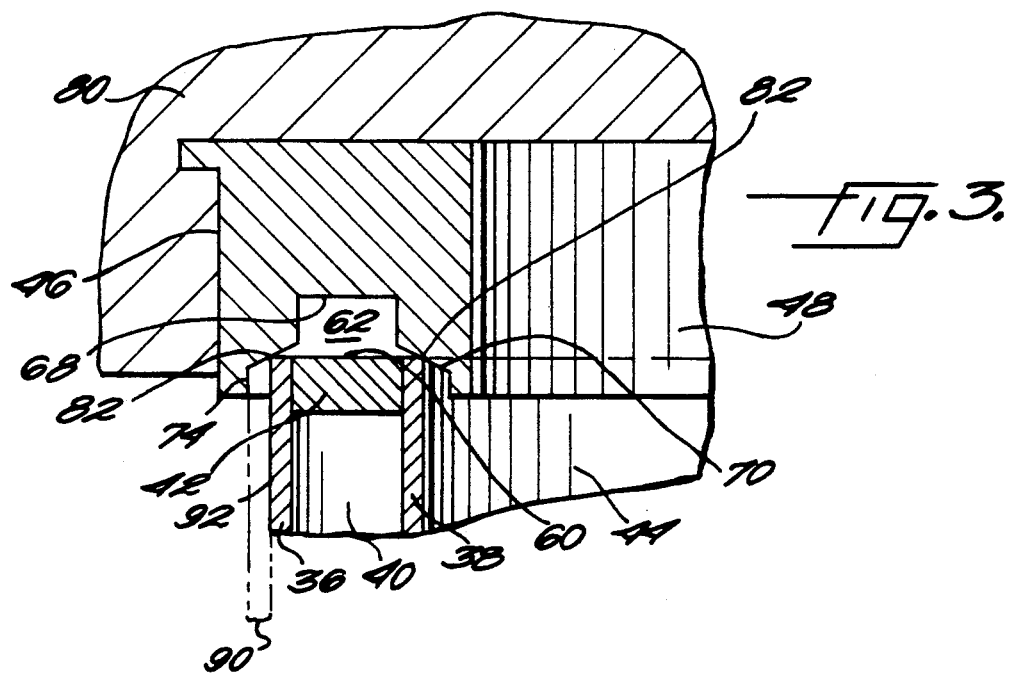
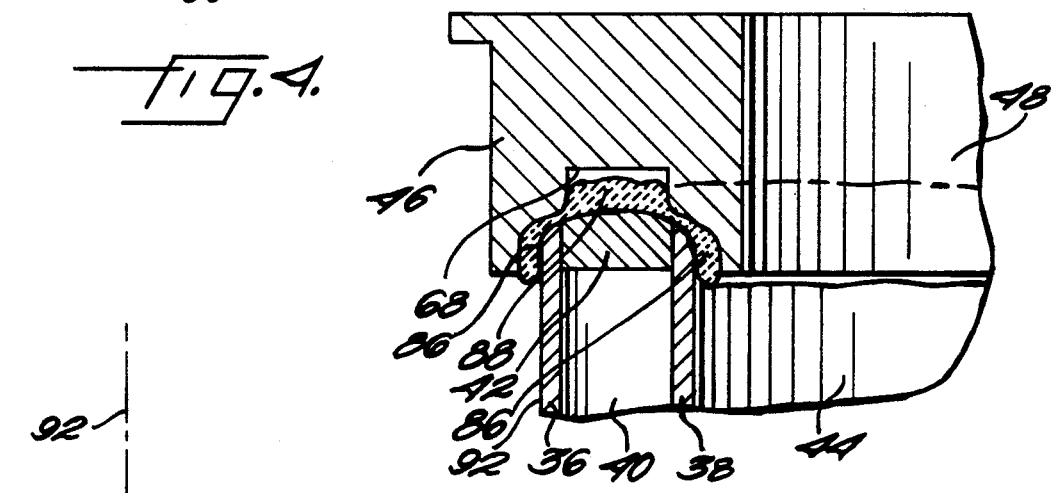
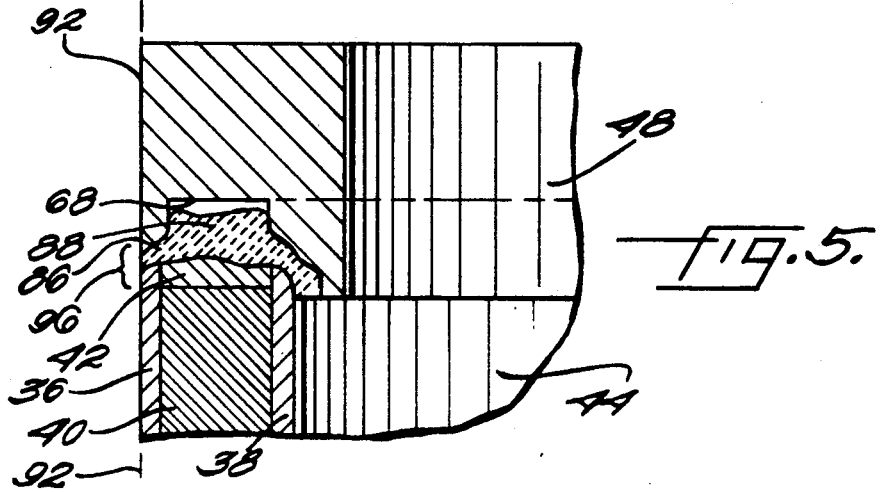

METHOD AND DEVICE FOR FRICTIONAL WELDING

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to methods for friction welding. More particularly, the present invention relates to a method and device for frictionally welding certain types of metal and metal alloy components.

2. Discussion of Background

Friction welding is a welding method, particularly suited for rotationally symmetrical objects, in which one or both of the objects to be welded are rotated at a predetermined speed. The two objects are then brought together under high pressure, or upset, to forge the materials together. One form of friction welding, inertial welding, varies slightly in procedure. Instead of using a constant speed motor drive to provide rotation, a flywheel attached to the rotational machine's spindle stores kinetic energy and disperses that energy to the weld interface when axial force is applied. The high pressure, or upset, involved in bringing these two objects together causes the displacement of metal from the two objects, called weld flash, which normally forms on the outside of the welded object. The weld flash is usually machined off, however, its removal sometimes results in defective welds.

Friction welding techniques and equipment are not new. Several U.S. patents detail various aspects of friction welding. U.S. Pat. No. 3,144,710 issued to Hollander, et al. describes several friction welding arrangements. Several issued U.S. patents describe flash traps, which are modifications in the structure of one or both of the welded objects that assist in providing a better weld by urging the weld flash toward a desirable location or away from an undesirable location. U.S. Pat. No. 4,832,769 issued to Shantz, et al. discusses the use of a flash trap to keep flash from an area that is subsequently modified mechanically to provide a better welded seal. U.S. Pat. No. 3,618,196 issued to Sluetz describes a technique using two successive welds to completely seal a particular portion of the weld flash in a rectangular flash trap internal to the final welded structure. Several other issued U.S. patents describe the friction welding of specific articles or friction welding methods adapted to particular environments.

None of the previously issued patents teach flash traps that are designed specifically to cause almost all of the weld flash to flow inwardly in order to achieve a completely sealed weld. This type of result is desired in applications where machining off external weld flash results in unacceptable welds. There exists a distinct need for an internal flash trap designed to assist in providing a superior welding seal by urging almost all of the weld flash internally, therefore all but eliminating external weld flash.

SUMMARY OF THE INVENTION

According to its major aspects and broadly stated, the present invention is a method for inertial friction welding two rotationally symmetric members using dynamic frictional force to provide a completely sealed weld. Preferably, a first generally cylindrical member, a weld ring, is welded to a second generally cylindrical member, a hollow cannister, so that neither liquid nor gases can obtain access into an annular depression contained in the cannister. The cannister's annular depression is defined by an outer rim, which functions as the cannister's outer wall, and an inner rim, which likewise functions as the cannister's inner wall. The inner rim encloses and defines a second annular depression which, preferably, is partially hollow. The weld ring has an annular channel that is slightly wider than the distance between the outer and inner rims of the cylindrical cannister. The channel has sides sloped at an angle and the channel is dimensioned just in excess of the expected flash volume. The weld ring is coaxially aligned with the capped cylindrical cannister and rotated at a predetermined speed via a flywheel. Once this speed is obtained, the weld ring is thrust against the cylindrical cannister until it stops rotating. The angled sides of the weld ring's channel allow most of the weld flash to flow internally into the channel's recessed flash trap, thereby providing a weld that completely seals the cap to the cylindrical cannister. The slight gap between the width of the annular channel and the distance between the outer and inner rims of the cannister allows a small amount of flash to be divided radially outwardly, external to the cannister's outer rim. Any material external to the outer rim of the cannister may subsequently be machined off.

A major feature of the present invention is the sloped side of the annular channel in the weld ring, preferably at approximately 30° for welding aluminum. The advantage of this feature is that the slope urges most of the weld flash internally, thereby eliminating most of the external flash that ultimately contributes to unacceptable welds when subsequently machined off. The angle also tends to minimize the distortion to the outer and inner rims of the cannister that normally occurs during frictional welding methods.

Another feature of the present invention is the arrangement and particular dimensions of the weld ring's annular channel. The channel is formed so that it can easily accommodate the weld flash that is urged internally. Also, the channel is dimensioned large enough so that it will accommodate at least all of the weld flash that is generated. Therefore, the channel will not fill up with weld flash and force additional weld flash externally.

Still another feature is the small clearance between the outer edge of the weld ring's annular channel and the outer surface of the cannister. This clearance is just large enough to allow a small amount of weld flash to flow externally toward the outer surface of the cylindrical cannister. This small amount further bonds the materials together so that a complete seal is achieved. The clearance is also small enough to keep most of the weld flash flowing internally.

Yet another feature is the recession of the sloped sides of the annular channel. A channel lip, preferably 0.05", is dimensioned to create enough friction during the welding process to cause the weld flash to flow inward.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a frictional welding device according to a preferred embodiment of the present invention;

FIG. 2 is a full cross-sectional view of the frictional welding device of FIG. 1, prior to commencement of a frictional welding method;

FIG. 3 is a detailed, partial cross-sectional view of the frictional welding device according to its preferred embodiment, just prior to commencement of a frictional welding method.

FIG. 4 is a detailed, partial cross-sectional view of the frictional welding device according to its preferred embodiment, just prior to completion of a frictional welding method.

FIG. 5 is a detailed, partial cross-sectional view of the frictional welding device according to its embodiment, after completion of a frictional welding method.

DETAILED DESCRIPTION OF A PREFERRED EMBODIMENT

Referring now to FIG. 1, the devices for a friction welding method in its preferred embodiment are a first generally cylindrical member 30 and a second generally cylindrical weld ring 32. Cylindrical member 30 has an outer rim 36 and an inner rim 38 that defines an annular first depression 40 (see FIG. 2), preferably a hollow storage area for uranium. The inner rim 38 encloses an annular second depression 44. During the friction welding method described herein, the cylindrical member 30 is capable of rotation but, preferably, remains stationary. The circular, generally solid weld ring 32 has an outer surface 46, a hollow center 48 and is preferably connected to some means of rotation (see 80, FIGS. 2 and 3), via a flywheel, during the method of friction welding.

Referring now to FIG. 2, a centering plug 52 preferably occupies the otherwise hollow annular second depression 44 of cylindrical member 30. The annular first depression 40, defined by outer rim 36 and inner rim 38, is enclosed by a cap 42 to seal its contents and form a second welding face 60. The cylindrical member 30 is then hot pressed through a die to obtain a very thin aluminum cladding around the entire assembly. The friction welding technique described herein becomes necessary because cap 42, despite the thin aluminum cladding, normally does not provide a complete seal: one that is free from problems of porosity and from problems of bonding between components.

An annular channel 62 is formed in the first welding face 64 of weld ring 32 so that weld ring 32 will fit generally onto cylindrical member 30. Annular channel 62 features a generally flat, recessed bottom 68, and is used as a flash trap during proper operation of the friction welding method. Also, annular channel 62 has sloped sides 70, preferably at angles approximately 30° with respect to the first welding face 64, that function as a means for directing generated weld flash into the annular channel 62. A channel lip 74 recesses annular channel 62, preferably a length of approximately 0.05", and ultimately creates sufficient friction during proper friction welding operation to ensure the complete sealing of annular first depression 40.

FIG. 3, FIG. 4, and FIG. 5 sequentially depict the method of friction welding, described herein, for providing a complete seal of annular first depression 40 of cylindrical member 30. Preferably, weld ring 32 is rotated at a predetermined speed by a rotational means 80, and cylindrical member 30 is held stationary. Upon reaching the predetermined speed, weld ring 32 is disengaged from its rotational means 80 and brought together with cylindrical member 30 under high pressure in an attempt to forge the two members together. The friction resulting from the initial contact 82 (see FIG. 3) of the second welding face 60 with the sloped sides 70 of channel 62 causes metal to be displaced in the form of weld flash 86 and 88. In ordinary friction welding methods of this type, nearly all of the generated weld flash 86 flows outward, while very little internal weld flash 88 remains. However, the sloped sides 70 of channel 62 work in combination with channel lip 74 to direct most of the weld flash 88 internally, toward the weld flash trap 68. As an alternative embodiment, a second annular channel can be formed in cap 42 to further direct the flow of weld flash 88 internally. Flash trap 68 is dimensioned to accommodate more weld flash 88 than is actually generated, therefore it never completely fills up with weld flash 88 when the friction welding occurs. The spacing 90 between the outer surface 92 of cylindrical member 30 and channel lip 74 is large enough to allow some external flow of weld flash 86, yet small enough to keep most of the weld flash 88 internal.

The friction welding procedure ends when weld ring 32 finishes rotating. Any material external to the outer surface 92 of cylindrical member 30 is subsequently machined off (see FIG. 5). The internal flow of weld flash 88, along with the small amount of externally flowing weld flash 86, completely seals cap 42 once external material is machined off (see area 96, FIG. 5). Despite very thin rims 36 and 38 with respect to the size of the annular first depression 40 defined by these rims, distortion of the structural integrity of rims 36 and 38, along with cap 42, is kept to a minimum during the entire friction welding method.

It will be apparent to those skilled in the art that many changes and substitutions can be made to the preferred embodiment herein described without departing from the spirit and scope of the present invention as defined by the appended claims.

What is claimed is:

1. A method for frictional welding together of two rotatable members, said method comprising the steps of:
   forming a channel in at least one of said members, said channel dimensioned to receive flash generated by frictional welding of said two members and having means formed in said at least one of said members for directing said flash into said channel, said directing means comprising sides of said channel sloped at an angle with respect to a plane perpendicular to the axis of rotation of said two rotatable members;
   rotating one of said members with respect to the other member; and
   bringing said members together to produce a weld therebetween, substantially all of said flash moving into said channel.

2. The method as recited in claim 1, wherein both of said two rotatable members are aluminum clad.

3. The method as recited in claim 1, wherein said angle is approximately 30°.

4. The method as recited in claim 1, wherein said channel has a generally flat bottom.

5. The method as recited in claim 4, wherein said bottom is recessed.

6. The method as recited in claim 1, wherein said at least one of said members has a first welding face perpendicular to the axis of rotation of said members, said channel being narrower than said first welding face.

7. The method as recited in claim 6, wherein said two members comprise a first member and a second member and said at least one of said members is said first member, said second member having a second welding face perpendicular to the axis of rotation of said members, said second face being narrower than said channel.

8. The method as recited in claim 1, wherein both of said two rotatable members are aluminum.

9. A method for coaxially welding a first generally cylindrical member to a second generally cylindrical member, said first generally cylindrical member having an outer surface and a first welding face generally perpendicular to the axis of said first cylindrical member, said second cylindrical member having an outer rim, an inner rim, and a second welding face generally perpendicular to the axis of said second cylindrical member and connecting said inner rim and said outer rim, said outer rim and inner rim defining therebetween a first annular depression, said inner defining a second annular depression, said method comprising the steps of:

forming a channel in said first cylindrical member, said channel dimensioned to receive flash generated by frictional welding of said first and said second cylindrical members and having means formed in said first cylindrical member for directing said flash into said channel;

rotating said first and second cylindrical members with respect to each other; and bringing said members together to produce a weld therebetween, substantially all of said of flash moving into said channel.

10. The method as recited in claim 9, wherein said first and second generally cylindrical members are aluminum clad.

11. The method as recited in claim 9, wherein said directing means further comprises sides of said channel sloped at an angle with respect to a plane perpendicular to the axis of rotation of said first and second cylindrical members.

12. The method as recited in claim 11, wherein said angle is approximately 30°.

13. The method as recited in claim 9, wherein said channels has a generally flat bottom.

14. The method as recited in claim 13, wherein said bottom is recessed.

15. The method as recited in claim 9, wherein said channel is narrower than said first welding face.

16. The method as recited in claim 15, wherein said second welding face is narrower than said channel.

17. The method as recited in claim 9, wherein the width of said inner rim and the width of said outer rim are small with respect to the width of said first annular depression.

18. The method as recited in claim 9, wherein said first and second generally cylindrical members are aluminum.

* * * * *